United States Patent Office 3,551,425
Patented Dec. 29, 1970

3,551,425
PRODUCTION OF 2-OXOHEXAHYDRO-
PYRIMIDINES
Harro Petersen, Frankenthal, Pfalz, Germany, assignor to
Badische Anilin- & Soda-Fabrik Aktiengesellschaft,
Ludwigshafen (Rhine), Germany
No Drawing. Filed June 26, 1968, Ser. No. 740,067
Claims priority, application Germany, July 1, 1967,
1,670,241
Int. Cl. C07d 51/18
U.S. Cl. 260—251    11 Claims

ABSTRACT OF THE DISCLOSURE

Production of 2-oxohexahydropyrimidines having the formula

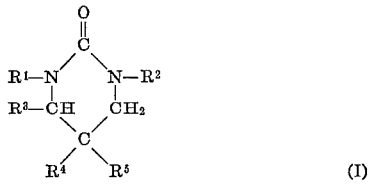

(I)

in which $R^1$, $R^2$ and $R^3$ are members selected from the group consisting of hydrogen, alkyl of 1 to 6 carbon atoms, aralkyl of 7 to 10 carbon atoms, cycloalkyl of 5 to 12 carbon atoms, or phenyl, $R^4$ and $R^5$ are alkyl of 1 to 6 carbon atoms, cycloalkyl of 5 to 12 carbon atoms, aralkyl of 7 to 10 carbon atoms, or phenyl by reacting a β-ureidopropionaldehyde having the formula

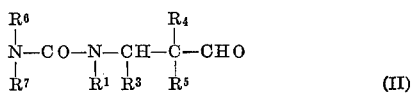

(II)

in which $R^6$ and $R^7$ are alkyl of 1 to 6 carbon atoms, aralkyl of 7 to 10 carbon atoms, cycloalkyl of 5 to 12 carbon atoms, phenyl or are common members of a heterocyclic ring having 4 to 5 carbon atoms and which may contain an oxygen or a nitrogen atom in place of a carbon atom, are reacted with ammonia or a primary amine and with hydrogen in the presence of a hydrogenation catalyst. The products are valuable starting materials for the production of textile and leather auxiliaries, aminoplast and surface coatings.

---

This invention relates to the production of 2-oxohexahydropyrimidines by reaction of β-ureidopropionaldehydes with ammonia or primary amines and hydrogen in the presence of a hydrogenation catalyst at elevated temperature and at superatmospheric pressure.

It is known from Liebigs Annalen der Chemie, 232, pp. 222 et seq. (1866) and from Recueil travaux chimiques des Pays-Bas, 26, pp. 218 et seq. (1907) that 2-oxohexahydropyrimidines can be prepared by reaction of 1,3-propylenediamines with dialkyl carbonates. Another method using 1,3-propylenediamines and urea as starting materials is described in U.S. patent specification No. 3,158,501. All these methods use difficulty accessible and therefore uneconomical 1,3-propylenediamines.

It is an object of this invention to provide a new and economic process for the production of 2-oxohexahydropyrimidines using readily accessible starting materials.

This and other objects and advantages of the invention are achieved and 2-oxohexahydropyrimidines having the general formula:

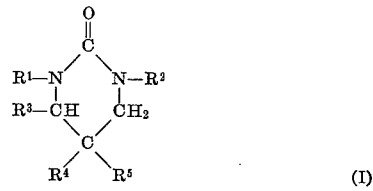

(I)

in which $R^1$, $R^2$, $R^3$, $R^4$ and $R^5$ may be identical or different and each denotes an aliphatic, araliphatic, cycloaliphatic or aromatic radical or $R^1$, $R^2$ and $R^3$ may also denote hydrogen are advantageously obtained by reacting a β-ureidopropionaldehyde having the general formula:

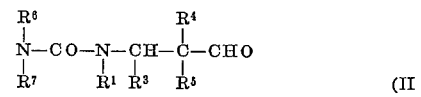

(II)

in which $R^1$, $R^3$, $R^4$ and $R^5$ have the above meanings and $R^6$ and $R^7$ may be identical or different and each denotes an aliphatic, araliphatic, cycloaliphatic or aromatic radical or $R^6$ and $R^7$ may be common members of a heterocyclic ring, with ammonia or a primary amine having the general formula:

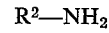

in which $R^2$ has the above meanings, and with hydrogen in the presence of a hydrogenation catalyst and, if desired, a solvent at a temperature of from 100° to 200° C., preferably from 100° to 130° C., and at a pressure of from 30 to 300 atmospheres, preferably from 50 to 200 atmospheres.

The process according to the invention may be reproduced, for example for the reaction of N,N-dimethylureido-N'-neopentanal with ammonia and hydrogen by the following equation:

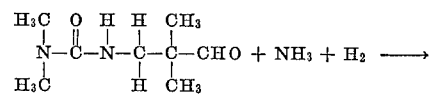

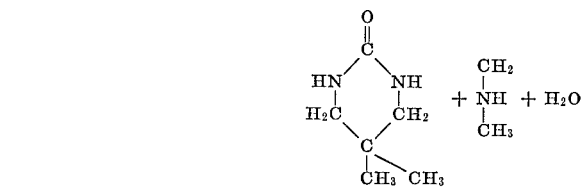

Contrasted with the abovementioned methods, the process according to this invention uses readily accessible starting materials and yields 2-oxohexahydropyrimidines in good yields. It is surprising that other reactions (as for example elimination of the ureido portion) play no part in the reaction.

The β-ureidopropionaldehyde having the Formula II to be used as starting materials are accessible easily and in good yields by reaction of appropriate unsymmetrically substituted ureas which bear at least one hydrogen atom on a nitrogen atom with formaldehyde and a CH-acid aldehyde (see the specification of U.S. patent application No. 661,515, filed Aug. 18, 1967, by Harro Petersen).

Preferred starting materials (II) and starting amines having the formula $R^2$—$NH_2$ (and consequently preferred end products (I)) are those in whose formulae $R^1$, $R^2$, $R^3$, $R^4$, $R^5$, $R^6$ and $R^7$ are identical or different and each denotes an alkyl radical having one to six carbon atoms, an aralkyl radical having seven to ten carbon atoms, a cycloalkyl radical having five to twelve carbon atoms or a phenyl radical, and $R^1$, $R^2$ and $R^3$ may also denote hydrogen and $R^6$ and $R^7$ may also be common members of a heterocyclic ring having four to five carbon atoms and which may contain an oxygen atom or another nitrogen atom instead of a carbon atom.

For example the following β-ureidopropionaldehydes may be used as starting materials: N,N-dimethylureido-N'-neopentanal, N-methyl-N-ethylureido-N'-neopentanal, N-benzyl-N-methylureido-N'-methyl-N'-neopentanal, N-cyclohexyl-N-methylureido-N'-(3) - 2,2 - diethylpropionaldehyde, N-morpholinoureido-N'-neopentanal, N-piperidylureido-N'-neopentanal, N,N-dimethylureido-N'-ethyl-N' - neopentanal, and N,N - dimethylureido-N'-(3)-2-methyl--2-ethylpropionaldehyde; ammonia and the following primary amines are examples of starting materials: methylamine, ethylamine, isobutylamine, benzylamine, cyclohexylamine and aniline.

Ammonia or primary amines may be used in stoichiometric amounts (with reference to starting material (II)) or in excess, as a rule in an excess of up to 1000% by weight with reference to the stoichiometric amount. They may be used in any condition, for example as gaseous or liquid ammonia, and also dissolved in a solvent which is inert under the reaction conditions.

The reaction is carried out with hydrogen in the presence of a hydrogenation catalyst. Generally one or more metals having an atomic number of from 24 to 29, as a rule cobalt or nickel catalysts, for example appropriate sintered catalysts which may contain up to 30% by weight of copper, manganese, iron and/or chromium, may be used as hydrogenation catalyst; it is preferred to use Raney nickel or Raney cobalt. The catalysts are used as a rule in amounts of 0.5 to 50% by weight with reference to the starting material (II). Hydrogen is used in an excess with reference to the starting material (II). As a rule hydrogen is supplied to the reaction mixture at the start and during the reaction in such amounts that an appropriate reaction pressure is always set up at the reaction temperature. The reaction takes place at a pressure of from 30 to 300 atmospheres, preferably from 50 to 200 atmospheres; the reaction temperature is from 100° to 200° C., preferably from 100° to 130° C. Inert gases, such as nitrogen, may be used in addition to hydrogen to set up an appropriate pressure.

Solvents which are inert under the reaction conditions may also be used for the reaction. Examples of such solvents are water, cyclic ethers such as dioxane or tetrahydrofuran, or primary or secondary alkanols having one to eight carbon atoms. They may be supplied individually or mixed in any combination, for example with each other or a starting material, to the reaction medium. The solvent is generally used in an amount by weight of up to ten times that of starting material (II).

The reaction may be carried out as follows: the β-ureidopropionaldehyde, with or without a solvent, is placed in a reactor, the hydrogenation catalyst is added and the reaction chamber is flushed out with nitrogen. Then the ammonia or amine is added and hydrogen is forced in. This sequence of addition is most advantageous as a rule but may be varied at will. All appropriate pressure units such as autoclaves or agitated pressure vessels are suitable as reactors. The reaction mixture is advantageously mixed during the reaction in a suitable manner, for example using stirring equipment or ar stream of gas. The reaction mixture is then heated to a temperature of from 100° to 200° C., preferably from 100° to 130° C., and kept at this temperature while passing further hydrogen through until no further hydrogen is used up. The reaction period is generally from two to three hours, but shorter or longer periods are possible depending on the conditions used. The reaction mixture is then cooled; solvent, unreacted amine or excess of ammonia and the disubstituted amine (for example dimethylamine) eliminated by the reaction are distilled off and the 2-oxohexahydropyrimidine obtained is separated from the residue by a conventional method such as recrystallization from a suitable solvent, filtration or extraction.

The process may also be carried out continuously; for example the reaction mixture may be passed over the hydrogenation catalyst under the abovementioned conditions.

The 2-oxohexahydropyrimidines which can be prepared by the process according to the invention are valuable starting materials for the production of textile and leather auxiliaries, aminoplasts and surface coatings. Thus for example cotton cloth may be impregnated with end products I (where $R^1$ and $R^2$ are hydrogen) in aqueous suspension (to which formaldehyde has been added at the molar ratio of 1:2 as well as 15–30 g./kg. of magnesium chloride) in an amount of 50 to 200 grams per kilogram of fibrous material, dried, the cloth passed through a condensation plant at 120° to 160° C. and thus given a creaseproof and swellproof finish.

The invention is illustrated by the following examples. Parts referred to in the examples are parts by weight.

EXAMPLE 1

A solution of 344 parts of N,N-dimethylureido-N'-neopentanal in 800 parts of methanol is placed in a stirred autoclave, 50 parts of Raney nickel is added, the reaction space is swept with nitrogen, 300 parts of liquid ammonia is added and hydrogen is pressured into the autoclave until a total presure of 150 atmospheres was reached. The reaction mixture is heated up to 120° C. while stirring and the hydrogen used up during the reaction is continuously replenished. When further absorption of hydrogen does not take place, the reaction mixture is cooled and concentrated. In this way methanol and water distill off together with the excess ammonia and the dimethylamine eliminated during the cyclization. The residue which remains is recrystallized from water. 232 parts of 2-oxo-5,5-dimethylhexahydropyrimidine is obtained (corresponding to 91% of the theory).

The melting point, infrared spectrum and elementary analysis data of the recrystallized product agree with those of 2-oxo-5,5-dimethylhexahydropyrimidine prepared by another method.

*Analysis.*—Calc'd for $C_6H_{12}ON_2$ (128) (percent): C, 56.3; H, 9.38; O. 12.5; N, 21.9. Found (percent): C, 56.5; H, 9.5; O, 12.7; N, 21.1.

EXAMPLE 2

500 parts of a 20% aqueous solution of methylamine is added to a solution of 186 parts of N,N-dimethylureido-N'-methyl-N'-neopentanal in 500 parts of methanol, 40 parts of Raney nickel is added and hydrogenation is carried out in a stirred autoclave at a hydrogen pressure of 200 atmospheres at 120° C. The hydrogen used up is continually replaced. The hydrogenation is over after two hours. The reaction mixture is cooled, filtered and water, methanol, excess methylamine and the dimethylamine eliminated during the cyclization are separated from the mixture by distillation; 139 parts of 2-oxo-1,3,5,5-tetramethylhexahydropyrimidine is obtained as a crude product (equivalent to 89% of the theory). The pure 2-oxo-1,3,5,5 - tetramethylhexahydropyrimidine has a boiling point of 81° to 82° C. at 0.2 mm.

*Analysis.*—Calc'd for $C_8H_{16}ON_2$ (156) (percent): C, 61.6; H, 10.25; O, 10.25; N, 17.95. Found (percent): C, 61.2; H, 10.0; O, 10.2; N, 17.6.

EXAMPLE 3

A solution of 214 parts of N,N-dimethylureido-N'-(3)-(2,2-dimethyl-3-isopropyl)-propionaldehyde in 1000 parts of methanol is placed in a stirred autoclave of V2A steel. 60 parts of Raney nickel is added, the reaction space is swept with nitrogen, 200 parts of liquid ammonia is added and hydrogen is then pressured in until a total pressure of 150 atmospheres is reached. The reaction mixture is heated to 130° C. while stirring and hydrogen used up is continuously replaced. Hydrogenation is over after about two hours. The catalyst is filtered off and the reaction mixture evaporated. 153 parts of 2-oxo-5,5-dimethyl-6-isopropylhexahydropyrimidine is obtained as a crude product (equivalent to 90% of the theory). The end product may be recrystallized from methanol and corresponds in its elementary analytical and infrared spectroscopic data with the comparable product prepared by another method.

*Analysis.*—Calc'd for $C_9H_{18}ON_2$ (170) (percent): C, 63.5; H, 10.6; N, 16.5. Found (percent): C, 63.2; H, 10.4; N, 16.6.

I claim:
1. A process for the production of 2-oxohexahydropyrimidines having the general formula

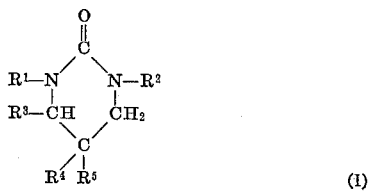

in which $R^1$, $R^2$ and $R^3$ are members selected from the group consisting of hydrogen, alkyl of 1 to 6 carbon atoms, aralkyl of 7 to 10 carbon atoms, cycloalkyl of 5 to 6 carbon atoms, or phenyl, $R^4$ and $R^5$ are alkyl of 1 to 6 carbon atoms, aralkyl of 7 to 10 carbon atoms, cycloalkyl of 5 to 6 carbon atoms, or phenyl, by reacting a β-ureidopropionaldehyde having the formula

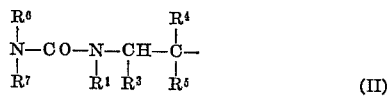

in which $R^6$ and $R^7$ are alkyl of 1 to 6 carbon atoms, aralkyl of 7 to 10 carbon atoms, cycloalkyl of 5 to 6 ring carbon atoms, phenyl or are common members of a heterocyclic morpholino or piperidyl ring with ammonia or a primary amine having the general formula $$R^2\text{—}NH_2$$

in which $R^2$ has the above meaning and with hydrogen in the presence of a cobalt or nickel hydrogenation catalyst at a temperature of from 100° to 200° C. and at a pressure of from 30 to 300 atmospheres.

2. A process as claimed in claim 1 carried out with the ammonia or primary amine in an excess of up to 1000% by weight over the stoichiometric amount.

3. A process as claimed in claim 1 carried out with a cobalt catalyst.

4. A process as claimed in claim 1 carried out with a nickel catalyst.

5. A process as claimed in claim 1 carried out with Raney cobalt.

6. A process as claimed in claim 1 carried out with Raney nickel.

7. A process as claimed in claim 1 carried out with 0.5 to 50% by weight of hydrogenation catalyst, with reference to the starting material (II).

8. A process as claimed in claim 1 carried out at a pressure of from 50 to 200 atmospheres.

9. A process as claimed in claim 1 carried out at a temperature of from 100° to 130° C.

10. A process as claimed in claim 1 carried out in the presence of an inert solvent.

11. A process as claimed in claim 1 carried out in an amount of inert solvent which is up to ten times the weight of the starting material (II).

References Cited

UNITED STATES PATENTS 3,137,697  6/1964  Boswell et al. _____ 260—251

ALEX MAZEL, Primary Examiner

R. V. RUSH, Assistant Examiner

U.S. Cl. X.R.

8—115.5; 252—8.8; 260—247.2

PO-1050
(5/69)

UNITED STATES PATENT OFFICE
CERTIFICATE OF CORRECTION

Patent No. 3,551,425          Dated December 29, 1970'

Inventor(s) Harro Petersen

It is certified that error appears in the above-identified patent and that said Letters Patent are hereby corrected as shown below:

Column 2, line 57, "$\beta$-ureidopropionaldehyde" should read -- $\beta$-ureidopropionaldehydes --.

Column 3, line 36, "catalyst" should read -- catalysts --.

Column 5, claim 1, formula II, "C-" should read -- CHO --.

Signed and sealed this 4th day of May 1971.

(SEAL)
Attest:

EDWARD M. FLETCHER, JR.          WILLIAM E. SCHUYLER,
Attesting Officer                  Commissioner of Pater